United States Patent [19]
Van Steenis et al.

[11] 3,956,245
[45] May 11, 1976

[54] BULK COPOLYMERIZATION OF VINYL ESTER

[75] Inventors: Adrianus M. C. Van Steenis; William J. Van Westrenen, both of Delft, Netherlands

[73] Assignee: Shell Oil Company, Houston, Tex.

[22] Filed: Apr. 23, 1974

[21] Appl. No.: 463,329

[30] Foreign Application Priority Data
May 9, 1973   United Kingdom............... 22144/73

[52] U.S. Cl............................. 260/878 R; 526/227; 526/272; 526/304; 526/324; 526/342; 526/350; 526/79; 260/886
[51] Int. Cl.$^2$..................... C08F 2/02; C08F 218/19
[58] Field of Search............ 260/87.3, 80.81, 878 R, 260/80.8, 78.5 R, 78.5 HC, 78.5 E, 88.1 PC

[56] References Cited
UNITED STATES PATENTS

| | | | |
|---|---|---|---|
| 2,600,783 | 6/1952 | Kropa | 260/85.5 |
| 2,658,057 | 11/1953 | Park | 260/92.8 |
| 3,178,395 | 4/1965 | Muskat | 260/78.5 |
| 3,466,350 | 9/1969 | Harris | 260/886 |
| 3,669,942 | 6/1972 | Van Westrenen et al. | 260/78.5 R |

OTHER PUBLICATIONS

Kirk–Othmer, Encyclopedia of Chem. Tech, 2nd Edition, Vol. 16, p. 233 (1968).

*Primary Examiner*—John Kight, III

[57] ABSTRACT

A process for the production of co- and multi-monomer random polymers involves the free-radical bulk polymerization of vinyl esters and styrene while controlling the rate of polymerization via the gradual addition of styrene to the polymerization medium during polymerization.

3 Claims, No Drawings

BULK COPOLYMERIZATION OF VINYL ESTER

BACKGROUND OF THE INVENTION

Generally, free-radical initiated polymerizations are highly exothermic reactions and although bulk, solution, emulsion and dispersion processes are possible, the latter three are used most often. This results from the moderating effect of the diluent in controlling the exotherm by reducing the viscosity of the medium thus enabling the reaction medium to be stirred easily, dissipating the excess heat of reaction.

While bulk copolymerization of vinyl esters is theoretically possible, the problems of heat dissipation have heatherto prevented the use of this process on a technical or commerical scale. The problem is essentially a cyclic one. As the polymerization proceeds it both produces heat and becomes more viscous. It must be efficiently stirred to dissipate the heat but to do so requires a higher temperature to reduce the viscosity and this in turn speeds up the reaction leading to a runaway polymerization. The larger the batch size, the more this problem is compounded.

On the other hand, a technically feasible bulk copolymerization process for vinyl esters and α-alkenyl aromatic hydrocarbons is very desirable. Polymers made from vinyl esters and styrene together with other unsaturated monomers containing cross-linkable functional groups like acids, amides, alcohols, esters and anhydrides such as those reported in U.S. Pat. No. 3,669,942 issued June 13, 1972 and U.K. Pat. No. 1,249,390 issued Oct 13, 1971 are useful in paints and coatings. These polymers are useful as weather resistant powder coatings, nonaqueous dispersion coatings, water-soluble paint binders and binders for solution paints. Producing these polymers by a bulk process offers the advantages that they can be used directly in solvent free coating formulations. Bulk polymerization increases the yield of copolymer per volume of reactor and avoids the drawbacks associated with removing solvents such as, energy consumption, extra equipment, and time consumption.

We have now found a novel bulk process for producing polymers containing vinyl esters and α-alkenyl aromatic hydrocarbons which comprises the gradual addition of the α-alkenyl aromatic hydrocarbon to the reaction medium containing a vinyl ester at a temperature which enables the medium to be stirred so as to dissipate the heat of reaction. The gradual addition of the α-alkenyl aromatic monomer retards the overall polymerization rate so as to slow the evolution of heat and allows one to maintain a temperature of reaction conducive to heat removal by stirring.

SUMMARY OF THE INVENTION

The invention relates to a bulk process for the free-radical polymerization of vinyl esters and α-alkenyl aromatics. It relates to the bulk free-radical polymerization of vinyl esters and α-alkenyl aromatics in the presence of an initiator and optionally a molecular weight regulator, in which polymerization the α-alkenyl aromatic is gradually added either continuously or in stages over a 4 to 24 hour period in which substantially most of the time the temperature is maintained over about 150°C. The invention also relates to a bulk free-radical polymerization in the presence of a free-radical forming initiator, and optionally a molecular weight regulator using A. 1–99 parts by weight of vinyl esters of the general formula:

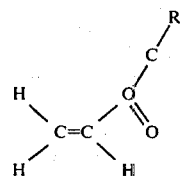

where R is a monovalent hydrocarbon group having 1–25 atoms,

B. 1–99 parts by weight of an α-alkenyl aromatic hydrocarbon,

C. 0–50 parts by weight of an ester, amide, and/or nitrile of an ethylenically unsaturated monocarboxylic acid having 3–4 carbon atoms per molecule, D. 0–30 parts by weight of an ester of an ethylenically unsaturated dicarboxylic acid having 4–5 carbon atoms, E. 0–20 parts by weight of an ethylenically unsaturated mono- or dicaboxylic acid, or anhydride thereof, having 3–5 carbon atoms per molecule, and F. 0–20 parts by weight of a mono-ethylenically unsaturated polymeric hydrocarbon having a molecular weight higher than 1000, which process is characterized in that a reactor charge comprising at least part of component (A), optionally component (F), and optionally part of the initiator and optionally part of components (B), (C), (D), and (E) is heated from a temperature below reaction temperature to the reaction temperature, and then kept at reaction temperature, with gradual addition of component (B) and initiator, and optionally the remainder of the components (A), (C), (D), and (E) in one or more stages during 4–24 hours.

The invention particularly relates to the above described process where (A) is a vinyl ester of saturated tertiary monocarboxylic acids having $C_9$ to $C_{11}$ chain length and (B) is sytrene.

DESCRIPTION OF THE PREFERRED EMBODIMENTS

There are two essential features of the bulk polymerization: 1) The reaction temperature must be high enough (above the melting point of the polymer to be made) to give a reaction viscosity which will allow efficient heat removal by stirring. 2) The weight ratio of the vinyl ester to the α-alkenyl aromatic monomer must be high enough to retard the polymerization thereby retarding the heat generation and preventing a runaway polymerization.

The reaction temperature range between about 150°C and about 200°C has been found to be desirable in that it gives the proper viscosity and reaction rate. The preferred reaction temperature range is between about 150°C and about 180°C while a particularly preferred reaction temperation range is between about 155°C and about 170°C. It is possible to obtain conversions of above 98% in these temperature ranges using the proper initiator without having a runaway polymerization.

Calculated weight ratios of vinyl ester to α-alkenyl aromatic hydrocarbon of below 25:1 have given excellent results. This weight ratio is that which exists initially once the reaction temperature has been reached. The ratio is achieved by starting with that ratio of monomers and heating to the reaction temperature or the ratio is achieved by adding the required amount of α-alkenyl aromatic hydrocarbon (retarder monomer) during the period that the reaction is heated to the reaction temperature. The minimum rate of addition of the retarder monomer is that necessary to hold the reaction temperature at the desired level. The maximum rate at which the retarder monomer is added is dependent on the amount of α-alkenyl aromatic hydrocarbon desired in the final product. It is understood that the calculated weight ratio of 25:1 may not represent the ratio of monomers present when the reaction temperature is initially reached in that some of the components may have polymerized at lower temperatures during the heat up. But it has been found that this is immaterial so long as this weight ratio of monomers has been added to the reactor before the reaction temperature has been reached.

The preferred free radical initiators are those which have a half lifetime of at least 0.4 hour at the minimum preferred temperature of 150°C. More preferred are initiators with half lifetimes of from about 0.6 to about 1.1 hours at 150°C and particularly preferred initiators are those having half lifetimes of from 0.6 to 0.9 hours. The latter initiators are particularly preferred if the main polymerization reaction is performed between 155° and 170°C, for example at 160°C. Initiators of this type are usually organic peroxides. The "half-lifetime" as employed herein is the time required to reduce by 50% the active oxygen content of a diluted solution or peroxide at the temperature indicated; for determining half lifetimes at 150°C the solvent is monochlorobenzene. Eligible initiators in the present process are, for example, hydrocarbon peroxides, e.g., tertalkyl or aryl hydroperoxide or peroxides such as 2,2-di-tert-butyl peroxybutane, dicumyl peroxide, tert-butyl cumyl peroxide, 1-3-bis(tert-butyl peroxyisopropyl) benzene, di-tert-butyl peroxide, di-isopropylbenzene monohydroperoxide, cumene hydroperoxide, tert-butyl hydroperoxide, and mixtures thereof. However, free radical initiators of other types are not excluded.

The polymerization is normally run by starting the addition of the α-alkenyl aromatic monomer when the reaction temperature of the vinyl ester or vinyl ester and other monomers is at about 85°C. While the initiator and vinyl ester are in contact before this time the rate of polymerization is not high enough to give any appreciable amount of polymer in the short time they are present without the retarder monomer. The reaction medium is heated to the desired reaction temperature above about 150°C in about 0.5 to 1.0 hours. The minimum addition rate of the α-alkenyl aromatic monomer is one that will allow the desired reaction temperature to be maintained at the rate of heat input. Experience shows that this rate of retarder monomer addition must be at least one where the calculated weight ratio of the vinyl ester to α-alkenyl aromatic compound is at least below 25:1 at about 150°C, i.e. at about 0.5 hours. Once the reaction temperature is reached it is maintained by the combination of the amount of heat added and removed and the rate of retardation by the addition of the α-alkenyl aromatic monomer.

The molecular weight of the polymers made by the process of the invention may be varied by the use of suitable known free radical molecular weight regulators such as mercapto compounds. Suitable mercapto compounds are dodecyl mercaptan, mercapto-acetic acid and mercapto ethanol. These regulators are preferably added together with the gradual addition of the α-alkenyl aromatic monomer, i.e. preferably dissolved in the monomers.

The polymerization is preferably performed in an oxygen free atmosphere, for example under nitrogen, and the reactor is preferably equipped with adequate means for stirring, heating, and cooling, and also with a reflux condenser to retain volatile components, such as styrene.

The polymerization should be performed at a pressure at which at least the vinyl ester, component (A), forms a liquid phase at the reaction temperature i.e. below about 200°C. For vinyl esters of monocarboxylic acids having at least 9 carbon atoms per molecule, atmospheric pressure is preferred, but lower and higher pressures may be used. Pressure between about 0.5 and about 100 atmospheres are suitable, between about 1 and about 50 atmospheres are preferred and between about 1 and 10 atmospheres are especially preferred. Volatile compounds (B), (C), (D), and (E), which are present in small amounts during the polymerization can be retained easily by an adequate refluxing unit.

The temperature of the reaction is subject to control by the addition of the retarder monomer, (B), the α-alkenyl aromatic compound, but additional control of the temperature is available by adjusting the heat input, the cooling of the sides of the reactor and the refluxing of the reaction media. It is only because the bulk reaction can be run at a temperature high enough that efficient stirring can be achieved that these latter methods are useful and it is only by gradually adding the retarder monomer that the reaction can be run at the elevated temperatures without a runaway polymerization.

Once the polymerization is complete, the remaining excess monomer may be removed by lowering the pressure and distilling it off or the product can be used as is. It may be dissolved in a solvent or dumped and cooled; the cooled product solidifies easily to a homogeneous solid mass which is ground and sieved by conventional means to the desired particle size.

The vinyl ester, component (A), is a vinyl ester of a saturated monocarboxylic acid in which the carboxylic acid has from 2 to 25 carbon atoms per molecule. Examples of vinyl esters suitable for the process of this invention are vinyl acetate, vinyl propionate, vinyl laurate, vinyl sterate and vinyl benzoate. Preferred vinyl esters are those in which the carboxylate radical is a saturated aliphatic monocarboxylic acid in which the carboxyl group is attached to a tertiary or quaternary carbon atom, and which carboxylic acids have 5 to 25, preferably 9 to 19 and more preferably 9 to 11, in particular 10, carbon atoms per molecule.

For convenience such carboxylic acids will hereinafter be referred to as "branched monocarboxylic acids," and the vinyl esters as "vinyl esters of branched monocarboxylic acids." "Aliphatic" in this connection will include acylic aliphatic as well as cycloaliphatic.

The branched monocarboxylic acids are obtained by reacting formic acid or carbon monoxide and water with olefins in the presence of liquid, strongly acidic catalysts. The olefins are products obtained by cracking paraffinic hydrocarbons, such as mineral oil fractions, and these olefins contain branched as well as straight chain acylic and/or cycloaliphatic olefins. Reaction of such olefins with formic acid, or carbon monoxide and water, produces a mixture of carboxylic acids in which the carboxyl group is predominantly attached to a quaternary carbon atom. Other olefinic starting materials are, for example, propylene trimer, propylene tetramer, and di-isobutylene. The vinyl esters can be prepared from the acids by processes known in the art, for example by reacting the acids with acetylene.

Copolymers of vinyl esters of branched monocarboxylic acids have found many applications, in particular as binders in surface coating formulations, since the branched structure incorporates practically unsaponifiable ester groups into the polymer molecule, and imparts valuable properties to the final structure, such as improved resistance to water and to alkaline materials. Such copolymers, previously prepared by polymerization in aqueous emulsion or suspension or in solution in organic solvents, have found use in emulsion paints, paper-coating emulsions, electrodeposition paints, and thermosetting solution paints.

The α-alkenyl aromatic hydrocarbon component (B), which is a compulsory component in the present invention is a monovinyl aromatic hydrocarbon having the formula:

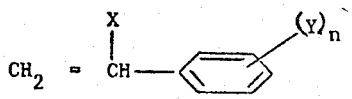

where the total number of carbon atoms is from 8 to 10, X is a hydrogen or a methyl group, Y is a methyl group which is substituted for a ring hydrogen and n is a whole number which varies from 0 to 2 inclusive. Examples of suitable component (B) are styrene, the vinyl toluenes, the vinyl xylenes and α-methylstyrene. The preferred α-alkenyl aromatic hydrocarbons are styrene and α-methylstyrene. Styrene is particularly preferred.

Components (C), (D), (E), and (F) are optional in the present process. One or more of them may be used for a specific application of the polymer.

Component (C) comprises esters, amides, and nitriles derived from α-unsaturated monocarboxylic acids having 3 or 4 carbon atoms per molecule. Suitable nitriles are acrylonitrile and methacrylonitrile; suitable amides are acrylamide, methacrylamide, and hydroxy- or alkoxymethylated derivatives thereof, such as hydroxymethyl and alkoxymethyl derivatives, wherein the alkyl group has from about 1 to about 18, preferably from about 1 to 11, more preferably from 1 to 4, carbon atoms. Suitable esters are esters of acrylic, methacrylic and crotonic acid in a 1:1 molar ratio acid: alcohol with monohydric or polyhydric alcohols having 1-20 carbon atoms per molecule, such as methanol, ethanol, butanol, 2-ethyl hexanol, lauryl alcohol, octadecanol, ethylene glycol, propylene glycol, glycidol.

Component (D) comprises esters of dicarboxylic acids having 4-5 carbon atoms per molecule inclusive with saturated monohydric alcohols having preferably 1-4 carbon atoms per molecule inclusive, such as dimethyl maleate, diethyl fumarate, dibutyl furmarate and diethyl itaconate.

Component (E) comprises ethylenically unsaturated mono-and dicarboxylic acids, and anhydrides thereof having 3-5 carbon atoms per molecule inclusive, as exemplified by acrylic acid, methacrylic acid, crotonic acid, itaconic acid, maleic acid, maleic anhydride and furmaric acid.

Component (F) is preferably a polyisobutylene having a molecular weight (number average, indicated as $\overline{M}_n$) between 2,000 and 15,000; a particularly preferred material is a commerical polyisobutylene known as "Oppanol" B 10, having $\overline{M}_n = 8,000$. Other preferred materials are commercial polyisobutylenes known as "Napvis" D 200 and "Polyvis" 200 ($\overline{M}_n = 2000 - 3000$). "Opanol," "Napvis" and "Polyvis" are registered trademarks.

The following preferred methods of carrying out the process of the invention are useful when component A is a vinyl ester of branched mono-carboxylic acids having at least 9 carbon atoms per molecule.

A reactor is charged with at least a part of component (A) and a part of the initiator, and optionally component (F), and heated to 70°-100°C, preferably 85°C. Then, while heating the reactors, a mixture of component (B), initiator and optionally (A), (C), (D) and (E) is added gradually, e.g., by means of a pump, over a period of from 4 to 24 hours, at such a rate that the reactor charge will contain calculated amounts of (A) and (B) in a weight ratio of at most 25:1 when the temperature is 150°C. Heating is continued until the desired reaction temperature has been attained, say 160°C, and the reactor charge is kept at that temperature until all the monomer has been added. Further amounts of initiator may then be added, and the temperature may be raised a further 10°C (to 170°C) for 1 hour to complete the polymerization. When using di-tert-butyl peroxide as the initiator, an addition time of 5-7 hours at a reaction temperature of 160°C will produce very favorable results. The heating-up time may be from 30 to 60 minutes.

In a modified version the reactor is charged with a mixture of components (A) and (B) in a weight ratio of at most 25:1, initiator, and optionally component (F), and the mixture is heated to a reaction temperature, of 160°C; then the gradual addition of the remaining amounts of (B), initiator, and optionally (C), (D) and (E) is started.

The gradual addition of monomers can be performed in one or more stages. A one-stage addition is preferably chosen when the total amount of component (A) is charged into the reactor. A two-stage addition is preferred when only a part of component (A) is charged into the reactor, and the remaining part is added gradually, in admixture with other monomers. In a two-stage gradual addition procedure it is preferred to add in the first stage all of the component (A), in admixture with a portion of the other monomers, and to add then in a second stage the remaining portions of the other monomers.

Generally the free-radical initiator is used in a catalytic amount. The amounts of initiator are preferably an initial 1-3 percent by weight of original reactor charge, followed by 1-3 percent by weight of the gradually added monomers, and three additions of 0.1 to 0.2 percent by weight of total reactor charge following the gradual addition of monomers in 30 minutes' time intervals.

The amount of component (A) is preferably from 20 to 50 parts by weight, and the amount of component (B) from 10 to 90 parts by weight.

For copolymers of components (A) and (B), and optionally (C), (D), (E) and (F) a use in the field of slow-release agents for biologically active chemicals, such as insecticides, fungicides, herbicides and pharmaceuticals is envisaged. Copolymers containing from 3 to 10 percent by weight of residues of component (E) are neutralized wholly or partly by alkaline compounds, preferably ammonia or organic amines, and then dissolved in water for use as binders in electrodeposition paints. Further, copolymers containing acid groups may be used as cross-linking components in epoxy resin compositions. Copolymers from components (A), (B), (C), in which at least part of (C) is a hydroxy-containing ester, an amide, or a methylolated derivative of an amide, and optionally (D), (E) and (F) can be used as binders in thermosetting coating compositions, for example as binder component in powder coating compositions or solvent-based compositions with pehnol formaldehyde resins, amino formaldehyde resins, such as urea formaldehyde resins and melamine formaldehyde resins, or with polyisocyanates as curing agents. Copolymers from components (A), (B), (C), in which at least part of (C) is a glycidyl ester, and optionally (D) and (F) are used as binders in thermosetting compositions, in combination with curing agents for polyepoxides, such as amines, polycarboxylic acids and/or polycarboxylic acid anhydrides, such as phthalic anhydride, hexahydrophthalic anhydride, azelaic acid and adipic acid. Copolymers from components (A), (B) and optionally (C, (D), (E) and (F) are used as binders in aqueous emulsion compositions; an advantage is that the copolymer can be produced independently from the emulsification process. Copolymers from components (A), (B), and (F), and optionally (C), (D) and (E) are used as binders in non-aqueous dispersions for use in paint compositions. The copolymers are easily dispersed in aliphatic hydrocarbons, for example by stirring a heated mixture of aliphatic hydrocarbon and copolymer.

In each of the fields of use outlined above usual additives may be added, such a pigments, fillers, plasticizers, flow-control additives, cut-back agents, such as coal tar, aliphatic oils, asphaltic bitumen or waxes.

The process according to the invention enables the production of clear, colourless solid resins. The fact that they are clear indicates that the product is mainly a true copolymer, as homopolymers of the vinyl esters concerned and polystyrene are incompatible, and when mixed above their melting points and cooled, provide an opaque resin mixture. Further evidence that a true copolymer is obtained is provided by the glass transition temperature of the product. The polymer has in general one single glass transition temperature, but addition of polystyrene or of homopolymer of the vinyl ester concerned results in the appearance of a second glass transition temperature.

To illustrate the manner in which the invention may be carried out, the following Embodiments are provided. It is to be understood, however, that the Illustrative Embodiments are for the purpose of illustration and the invention is not to be regarded as limited to any of the specific materials or conditions recited herein.

ILLUSTRATIVE EMBODIMENTS IN GENERAL

Parts and percentages are by weight, unless otherwise indicated. The vinyl ester used in Illustrative Embodiment I–VIII ("VeoVa" 10 Carboxylic Acid; "VeoVa" is a registered trademark) is a vinyl ester of a mixture of saturated monocarboxylic acids having 10 carbon atoms per molecule and wherein the carboxyl groups are attached to a tertiary or quaternary carbon atom. "Initiator B" was di-tert.-butyl peroxide (half lifetime at 150°C: 0.8 hour), a commercial product known as "Trigonox B" ("Trigonox" is a registered trademark).

The general scheme in the Illustrative Embodiments was as follows:

A round-bottom flask of 1 liter, provided with stirrer, thermometer, reflux condenser, nitrogen inlet tube, heating jacket and connected to a metering pump was charged with "VeoVa" 10 and inititor (charge) and heated to 85°C. Then a mixture of further monomer components and initiator B was metered in gradually within 6½ hours, while the temperature of the reactor was raised to 160°C in 30 minutes, and kept at 160°C during 6 hours (unless other times are defined). Then three times an amount of 2 g of Initiator B was added, with intervals of ½ hour; the temperature was raised to 170°C and kept there during 1 hour. The content of the reactor was poured onto aluminium foil, allowed to cool and collected. The resin was inspected for colour and clarity, and was analyzed.

Illustrative Embodiment I

| | |
|---|---|
| Reactor charge | 200 g "VeoVa" 10 |
| | 6 g Initiator B |
| Gradual addition of | 800 g Styrene |
| | 12 g Initiator B |
| Temperature | from 85°C to 160°C in ½hour, then at 160°C during 6 hours, then 1 hour at 170°C (with supplementary 3 times 2 g initiator "B" added) |
| Product | clear, solid copolymer, soluble in acetone; content of free "VeoVa" 2.6% by weight (It is noted that homopolymer of "VeoVa" 10 is not soluble in acetone). |

Illustrative Embodiment II

| | |
|---|---|
| Reactor charge | 394 g "VeoVa" 10 |
| | 6 g Initiator B |
| Gradual addition of | 200 g methyl methacrylate |
| | 208 g styrene |
| | 36 g acrylic acid |
| | 49 g maleic anhydride |
| | 12 g Initiator B |
| | 10 g mercapto acetic acid |
| Temperature | from 85°C to 160°C in ½ hour, then at 160°C during 6½ hours, and 1 hour at 170°C |
| Product | clear, solid copolymer, free "VeoVa" content 0.5%, $\overline{M}_w$ 35,200, $\overline{M}_n$ 6,900. |

Illustrative Embodiment III

| | |
|---|---|
| Reactor charge | 295 g "VeoVa" 10 |
| | 6 g Initiator B |
| Gradual addition of | 300 g methyl methacrylate |
| | 208 g styrene |
| | 36 g acrylic acid |
| | 49 g maleic anhydride |
| | 12 g Initiator B |
| | 10 mercapto acetic acid |
| Temperature | as in Example II |
| Product | clear, solid polymer, free "VeoVa" content <0.1% $\overline{M}_w$ 17,900 $\overline{M}_n$ 6,200. |

EXAMPLE IV

| | |
|---|---|
| Reactor charge | 200 g "VeoVa" 10 |
| | 6 g Initiator B |
| Gradual addition of | see Table 4.1 (amounts in grams) |
| Product | clear, solid polymers; content of free "VeoVa": see Table 4.1 |

TABLE 4.1

| | styrene | methyl methacrylate | dibutyl fumarate | diethyl maleate |
|---|---|---|---|---|
| (a) | 400 | 200 | — | — |
| (b) | 400 | 100 | — | 100 |
| (c) | 400 | 100 | 100 | — |
| (d) | 400 | — | 200 | — |
| (e) | 400 | 100 | 200 | — |

TABLE 4.1 (Continued)

| | glycidyl methacrylate | Initiator B | residual "VeoVa" 10 content (%) |
|---|---|---|---|
| (a) | 200 | 12 | <0.1 |
| (b) | 200 | 12 | 1.0 |
| (c) | 200 | 12 | 1.1 |
| (d) | 200 | 12 | 2.3 |
| (e) | 100 | 12 | 1.8 |

Illustrative Embodiment V

| | |
|---|---|
| Reactor charge | 350 g "VeoVa" 10 |
| | 6 g Initiator B |
| Gradual addition of | see Table 5.1 (amounts in grams) |
| Product | clear, solid polymers; content of free "VeoVa": see Table 5.1. |

TABLE 5.1

| | styrene | methyl methacrylate | maleate or fumarate | glycidyl methacrylate |
|---|---|---|---|---|
| (a) | 350 | 269 | maleic anhydride 31 | — |
| (b) | 270 | 189 | dimethyl maleate 45.5 | 160 |
| (c) | 270 | 189 | diethyl maleate 54.5 | 160 |
| (d) | 270 | 189 | diethyl fumarate 54.5 | 160 |
| (e) | 270 | 189 | dimethyl maleate 45.5 | 160 |

TABLE 5.1 Continued

| | Initiator B | dodecane thiol | residual "VeoVa" 10 content (%) |
|---|---|---|---|
| (a) | 12 | — | 1.65 |
| (b) | 12 | — | 1.0 |
| (c) | 12 | — | <1.0 |
| (d) | 12 | — | 1.1 |
| (e) | 12 | 12 | 1.3 |

Illustrative Embodiment VI

| | |
|---|---|
| Reactor | 350 g "VeoVa" 10 |
| | 6 g Initiator B |
| Gradual addition of | see Table 6.1 (amounts in grams) |
| Product | clear, solid polymers; content of free "VeoVa": see Table 6.1. |

TABLE 6.1

| | styrene | methyl methacrylate | dimethyl maleate | glycidyl methacrylate |
|---|---|---|---|---|
| (a) | 220 | 189 | 45.5 | 160 |
| (b) | 220 | 189 | 45.5 | 160 |

TABLE 6.1 Continued

| | nitrile | Initiator B | residual "VeoVa" 10 (%) |
|---|---|---|---|
| (a) | acrylonitrile 50 | 12 | 1.2 |
| (b) | methacrylonitrile 50 | 12 | 1.2 |

Illustrative Embodiment VII

| | |
|---|---|
| Reactor charge | 200 g "VeoVa" 10 |
| | 3 Initiator B |
| Gradual addition (1) | see Table 7.1; time from 85°C to 160°C: ½ hour; total addition time: 4½ hours |
| Gradual addition (2) | 1¾ hours at 160°C |
| Final product | clear solid polymers; content of free "VeoVa": see Table 7.1. |

TABLE 7.1

|       | styrene | MMA | DMM | glycidyl methacrylate |
|-------|---------|-----|-----|-----------------------|
| (a)(1) | 68     | 90  | 33  | 65 |
| (2)   | 67      | 90  | 32  | 64 |
| (b)(1) | 218    | 73  | 33  | 65 |
| (2)   | 217     | 72  | 32  | 64 |

TABLE 7.1 Continued

|       | Initiator B | "VeoVa" 10 | residual free "VeoVa" 10 content (%) |
|-------|-------------|------------|--------------------------------------|
| (a)(1) | 6          | 291        |                                      |
| (2)   | 6           | —          | 1.0                                  |
| (b)(1) | 6          | 26         |                                      |
| (2)   | 6           | —          | 1.9                                  |

MMA: methylmethacrylate
DMM: dimethyl maleate

Illustrative Embodiment VIII

| Reactor charge | 22.4 | pbw of "VeoVa" 10 |
|----------------|------|-------------------|
|                | 10   | pbw of "oppanol" B 10 |
|                | 0.67 | pbw of Initiator B |
| Gradual addition of | 35.9 | pbw of styrene |
|                | 15.3 | pbw of methyl methacrylate |
|                | 6.4  | pbw of dimethyl maleate |
|                | 17.15 | pbw of 2-hydroxyethyl methacrylate |
|                | 2.79 | pbw of acrylic acid |
| Product        | solid resin, readily dispersible in aliphatic hydrocarbons. | |

We claim as our invention:

1. In the process for copolymerizing vinyl esters and α-alkenyl aromatic hydrocarbons where optionally the following monomers are also present;
   A. an ester, amide, and/or nitrile of an ethylenically unsaturated monocarboxylic acid having 3 to 4 carbon atoms per molecule,
   B. an ester of an ethylenically unsaturated dicarboxylic acid having 4–5 carbon atoms per molecule,
   C. an ethylenically unsaturated mono- or dicarboxylic acid, or anhydride thereof, having 3–5 carbon atoms per molecule, and
   D. a mono-ethylenically unsaturated polyisobutylene having a number average molecular weight between about 2000 and about 8000, the improvement which comprises a bulk free radically initiated process in which 20–50 parts by weight of a vinyl ester having the formula:

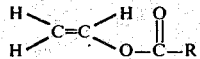

where R is a saturated hydrocarbon having from 9–19 carbon atoms, the carbon atom attached to the carboxyl function being tertiary or quaternary and 10–90 parts by weight of an α-alkenyl aromatic hydrocarbon having the formula:

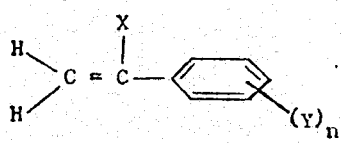

having from 8 to 10 carbon atoms per molecule, where X is a methyl group or hydrogen, Y is a methyl group, and n is an integer from 0 to 2 inclusive in a calculated weight ratio of vinyl ester to α-alkenyl aromatic hydrocarbon of at least below 25:1 are brought to a temperature of about 150°C to about 200°C in the presence of a catalytic amount of free radical initiator with a half lifetime of at least 0.4 hours at 150°C and the polymerization temperature maintained in the 150° to 200°C range by the combination of heating, cooling and retarding the polymerization by the gradual addition of α-alkenyl aromatic hydrocarbon together with a catalytic amount of said free radical initiator over a 4–24 hour period.

2. The process of claim 1 where the α-alkenyl aromatic hydrocarbon is styrene and the free radical initiator is di-tert-butyl peroxide.

3. The process of claim 2 in which the reaction temperature is between about 155°C and about 170°C.

* * * * *